United States Patent [19]
Blank et al.

[11] 3,793,149

[45] Feb. 19, 1974

[54] CELL-BOUND KERATINOLYTIC ENZYMES OR TRICHOPHYTON MENTAGROPHYTES AND PROCESS THEREFOR

[75] Inventors: Fritz Blank, Merion; Ruey J. Yu, Philadelphia, both of Pa.

[73] Assignee: Temple University, Philadelphia, Pa.

[22] Filed: Jan. 3, 1972

[21] Appl. No.: 215,120

[52] U.S. Cl.................... 195/66 R, 195/65, 195/62
[51] Int. Cl............................................ C07g 7/02
[58] Field of Search.......... 195/62, 65, 66 R, 4, 5, 6

[56] References Cited
UNITED STATES PATENTS
3,173,847    3/1965    Kita et al. ............................... 195/5

OTHER PUBLICATIONS
Yu et al., The Journal of Investigative Dermatology Vol. 56, No. 1, Jan. 1971, pages 27–32.
Chemical Abstracts Vol. 72, 39206h (1970).

*Primary Examiner*—Lionel M. Shapiro
*Attorney, Agent, or Firm* — Paul & Paul

[57] ABSTRACT

Two cell-bound keratinases are produced by incubating T. mentagrophytes for several days in growth medium, at a pH of 7.8, containing horse hair, magnesium salt, thiamine, pyridoxine and inositol. Preferably, glucose is also included. These keratinases are extracted from the fungus mycelium after filtering off the growth media, partially purifying the enzymes by adsorbing them separately on diethylaminoethyl cellulose and carboxymethyl cellulose. The first enzyme which is eluted from the diethylaminoethyl cellulose and purified by molecular sieves has a molecular weight of 440,000. The second enzyme which is eluted from the carboxymethyl cellulose and purified by molecular sieves has a molecular weight of 20,300. Physicochemical properties as well as their keratinolytic activities have been determined.

7 Claims, No Drawings

CELL-BOUND KERATINOLYTIC ENZYMES OR TRICHOPHYTON MENTAGROPHYTES AND PROCESS THEREFOR

INTRODUCTION

This invention pertains to a method for producing two cell-bound keratinolytic enzymes and to the product of that process.

BACKGROUND OF THE INVENTION

Keratin is a sulfur containing protein which forms the chemical basis of such relatively insoluble and undigestible epidermal material as hair, nail, callus, horn, feather and stratum corneum. An enzyme capable of digesting or solubilizing keratin may have both dermatological and industrial uses. Dissolving keratinous waste material or the removal of hair in the rendering of animal hides are typical of the possible industrial uses of such an enzyme. Dermatologically, those keratinolytic enzymes would find utility, for example, in the removal of calluses or the excessive keratin found in certain skin conditions, such as psoriasis. Further potential use might include immunization of human beings and animals with such enzymes for the protection against fungus infection.

It is the general object of the present invention to provide such enzymes and methods for the production thereof.

BRIEF DESCRIPTION OF THE INVENTION

Two active cell-bound keratinases are produced by incubating Trichophyton mentagrophytes in an aqueous growth medium having a pH of 7.8 and comprising horse hair, a magnesium salt, thiamine, pyridoxine and inositol. Preferably, glucose is also included to initiate the growth. Two cell-bound keratinases produced by the fungus are best isolated by first filtering off the incubated medium, then homogenizing the mycelium in phosphate buffer containing sodium chloride and successively contacting the buffer solution after dialysis with diethylaminoethyl cellulose and carboxymethyl cellulose. The first enzyme which is adsorbed on diethylaminoethyl cellulose is eluted with a buffered sodium chloride solution, dialyzed and lyophilized. The crude enzyme thus isolated is redissolved in buffered ionic solution and purified by molecular sieves such as Sephadex G-100. The product which has a molecular weight of 440,000 is highly keratinolytic, as shown by its ability to solubilize human callus tissue, calf hoof and guinea pig hair. The second enzyme which is adsorbed on carboxymethyl cellulose is eluted with a buffered sodium chloride solution, dialyzed and lyophilized. The crude enzyme thus isolated is redissolved in buffered ionic solution and purified by molecular sieves such as Sephadex G-100. The product which has a molecular weight of 20,300 is highly keratinolytic, as shown by its ability to solubilize human callus tissue, calf hoof, guinea pig hair and horse hair.

DETAILED DESCRIPTION OF THE INVENTION

The present invention is particularly pointed out and distinctly claimed in the concluding portion of this specification. It may be better understood, however, together with the further objects and advantages thereof, by reference to the following detailed description.

Trichophyton mentagrophytes var. granulosum (T. granulosum Sabouraud, 1909) is a known dermatophyte. Dermatophytes are parasitic fungi known to cause diseases such as ringworm in man and animals. The main pathogenic feature of dermatophytes is their ability to invade and thrive in the keratinized layers of skin, hair and nails. While this physiological property of dermatophytes has been known for some time, efforts to isolate and characterize dermatophytic enzyme with specific keratinolytic activity have met with only one example. The same present inventors isolated an extracellular keratinolytic enzyme from the culture medium of T. mentagrophytes in 1968. This extracellular enzyme was studied in detail and was well characterized. The present invention is particularly directed to the isolation and characterization of two cell-bound enzymes of the same species, which are nevertheless new and different from any previously known enzyme.

Production

Two cell bound enzymes are produced according to the present invention by inoculating a culture medium with T. mentagrophytes. Generally, the culture medium is composed of the following components in grams per liter of distilled water:

| | |
|---|---|
| Horse hair | 2.5 |
| Glucose | 0.9 |
| $MgSO_4 \cdot 7H_2O$ | 0.6 |
| Thiamine hydrochloride | 0.01 |
| Pyridoxine hydrochloride | 0.01 |
| Inositol | 0.05 |

$Na_2HPO_4 \cdot 7H_2O$ (6.87 grams) and $KH_2PO_4$ (0.333 grams) are added to produce a buffered pH of 7.8. Horse hair may be varied from about 1 to 5 grams. The magnesium concentration, about 5 millimole in the foregoing composition, may be varied within the range 1–10 millimoles. The buffered pH may be varied from 7 to 9.

After sterilization at 121° C and 15 psi for 20 minutes, the culture medium is inoculated with T. mentagrophytes and is kept in the dark for 5 days at 28° C. The culture medium is then shaken for 7 days and filtered. The mycelium is washed first with cold water then with cold acetone to remove lipids.

Isolation and Purification

Crude cell-bound enzymes are extracted from the mycelium by repeated blendoring in 0.01 M phosphate buffer, pH 7.8 containing 0.5 M NaCl and by dialyzing. Two enzymes in the dialyzed extract are adsorbed separately on diethylaminoethyl cellulose and carboxymethyl cellulose. The first enzyme which is adsorbed on diethylaminoethyl cellulose is eluted with 0.5 M NaCl in 0.01 M phosphate buffer, pH 7.5, dialyzed and lyophilized. Purification of this enzyme is accomplished by dissolving the lyophilized crude enzyme in 0.01 M phosphate buffer, pH 7.5, followed by gel filtration in a chromatographic separation column with a gel filtration agent such as Sephadex G-200 or G-100 molecular sieve. The first enzyme has a molecular weight of 440,000 as determined by the method of gel filtration on Sephadex G-200. The second enzyme which is adsorbed on carboxymethyl cellulose is eluted with 0.5 M NaCl in 0.01 M phosphate buffer, pH 7.8, dialyzed and lyophilized. Purification of the second enzyme is accomplished by dissolving the lyophilized preparation in 0.01 M phosphate buffer, pH 7.5, followed by gel filtration in a chromatographic separation column with a gel filtration agent such as Sephadex G-100 molecular sieve. The second enzyme has a molecular weight of 20,300 as determined by the method of gel filtration on Sephadex G-100.

Keratinolytic Activity

The keratinolytic activities of both enzymes produced by the foregoing process and the enhancement thereof as they are purified are best illustrated by the following table in which the fluid volume, total keratinolytic activity and specific keratinolytic activity (keratinolytic activity per milligram enzyme in solution) are given for the fluid at each stage of the purification process. The keratinolytic activity is given in units based on spectrophotometric analysis of reaction fluids of guinea pig hair as digested by enzyme material.

|  | | |
|---|---|---|
| Histidine | 7.57 | 14.65 |
| Isoleucine | 2.27 | 3.62 |
| Leucine | 4.54 | 3.62 |
| Lysine | 11.64 | 4.84 |
| Methionine | 0.51 | 0.82 |
| Phenylalanine | 3.43 | 3.64 |
| Proline | 6.78 | 5.72 |
| Serine | 6.91 | 5.80 |
| Threonine | 7.01 | 7.23 |
| Tryptophan | 3.53 | 2.25 |
| Tyrosine | 5.64 | 3.08 |
| Valine | 3.24 | 5.17 |
| Total | 99.90 | 100.00 |

The carbohydrate compositions of these two keratinases (polysaccharide portion) in grams per 100 grams, are as follows:

Keratinolytic Activity of Two Cell-Bound Keratinases

| Procedure | Volume (milliliters) | Total Activity ($\times 10^3$ KU) | Specific Activity (KU/mg) |
|---|---|---|---|
| 1. Mycelial extract | 1,102 | 3.05 | 19.9 |
| First Keratinase | | | |
| 2A. DEAE-cellulose | 215 | 0.46 | 23.4 |
| 3A. Sephadex G-100 | 12 | 0.29 | 36.4 |
| Second Keratinase | | | |
| 2B. CM-cellulose | 329 | 1.43 | 29.1 |
| 3B. Sephadex G-100 | 53 | 0.91 | 39.4 |

In other tests of the keratinolytic properties of the two keratinases of the present invention, the keratin content of human callus material in a reaction solution at 37° C and a pH of 7.0 was found to be 18 percent (by weight) digested by the first keratinase and 36 percent (by weight) digested by the second keratinase after 16 hours.

Physicochemical Properties

The physicochemical characteristics of the two keratinases of the present invention have been determined. The isoelectric points of the first and second keratinases are pH 4.40 and pH 9.85, respectively. Their elemental analyses, by weight are:

| | First keratinase | Second keratinase |
|---|---|---|
| Carbon | 48.53 | 40.93 |
| Hydrogen | 7.67 | 6.54 |
| Oxygen | 38.39 | 46.09 |
| Nitrogen | 3.05 | 5.01 |
| Sulfur | None | None |
| Ash | 2.38 | 1.67 |

The amino acid compositions of these two keratinases (protein portion) in grams per 100 grams, are as follows:

| | First keratinase | Second keratinase |
|---|---|---|
| Alanine | 5.86 | 4.42 |
| Arginine | 9.05 | 13.46 |
| Aspartic acid | 9.68 | 9.55 |
| Cystine | 0.41 | 0.66 |
| Glutamic acid | 6.11 | 6.50 |
| Glycine | 5.72 | 4.97 |

| | First keratinase | Second keratinase |
|---|---|---|
| Mannose | 81.0 | 66.7 |
| Galactose | 15.0 | 26.7 |
| Glucose | 4.0 | 6.7 |
| Total | 100.0 | 100.1 |

Subunit Structure

After these two pure keratinases were treated with mercaptoethanol and sodium dodecylsulfate the first enzyme was split into 9 different subunits with molecular weights of 6,100, 16,000, 18,200, 26,500, 30,000, 31,500, 41,500, 52,000 and 62,500, whereas the second enzyme was split into one identical subunit with molecular weight of 6,100.

pH Optimum

The two pure keratinases showed maximal enzymatic activity between pH 6.0 – 8.0 when guinea pig hair was used as substrate.

Optimum Temperature

The two pure keratinases showed maximal enzymatic activity at about 46° C when guinea pig hair was used as substrate.

Optimum Ionic Strength

Digestion of guinea pig hair by the two keratinases in sodium chloride solutions of various concentrations was maximal at 0.05 M Nacl in buffer, pH 7.0.

Effect of Metal Ions and EDTA

Effect of various metal ions and EDTA at 10 mM concentration on keratinolytic activity (percent) of the two keratinases is best illustrated by the following data.

| | First keratinase | Second keratinase |
|---|---|---|
| Control | 100 | 100 |
| $Ba^{++}$ | 110 | 102 |
| $Ca^{++}$ | 90 | 30 |
| $Cd^{++}$ | 0 | 0 |

|  | First keratinase | Second keratinase |
| --- | --- | --- |
| $Cu^{++}$ | 0 | 0 |
| $Mg^{++}$ | 100 | 110 |
| $Mn^{++}$ | 53 | 45 |
| $Se^{++++}$ | 93 | 42 |
| $Ag^{+}$ | 0 | 0 |
| $Zn^{++}$ | 0 | 0 |
| $Co^{++}$ | 13 | 56 |
| $Fe^{+++}$ | 0 | 0 |
| $Sn^{++++}$ | 0 | 0 |
| $Al^{+++}$ | 9 | 0 |
| EDTA | 15 | 14 |

Substrate Specificity on Amides, Peptides and Polypeptides

The selective reactivities of two cell-bound keratinases of the present invention in the hydrolyzation of amides, peptides, polypeptides and proteins have been studied and the results are shown in the following:

AMIDES, PEPTIDES OR PROTEINS HYDROLYZED BY TWO KERATINASES OF THE PRESENT INVENTION

1. L-Ser-β-Naph-NH₂
2. L-Thr-β-Naph-NH₂
3. L-Ala-β-Naph-NH₂
4. L-Arg-β-Naph-NH₂ · HCl
5. L-α-Glu-β-Naph-NH₂
6. Gly-β-Naph-NH₂
7. L-His-β-Naph-NH₂
8. L-Ile-β-Naph-NH₂ · HBr
9. L-Lys-β-Naph-NH₂
10. L-Met-β-Naph-NH₂
11. L-Orn-β-Naph-NH₂
12. L-Phe-β-Naph-NH₂
13. L-Val-β-Naph-NH₂
14. N-CBZ-α-Glu-L-Tyr
15. N-CBZ-Gly-L-Phe-NH₂
16. N-CBZ-L-Val-L-Tyr-OCH₃
17. N-CBZ-L-Val-L-Phe-OCH₃
18. N-CBZ-L-Val-L-Leu-OCH₃
19. N-CBZ-Gly-L-Leu
20. Gly-L-Phe
21. Gly-DL-NorLeu
22. α-Gly-L-Lys·HCl
23. Gly-L-Leu
24. Gly-L-Tyr
25. Gly-DL-Val
26. L-Tyr-L-Leu
27. N-CBZ-L-Leu-L-Ala-OCH₃
28. L-Leu-L-Tyr
29. N-CBZ-L-Pro-L-Leu-Gly-NH₂
30. Gly-L-Leu-L-Tyr
31. L-Leu-L-Leu
32. L-Leu-L-Met
33. DL-Leu-Gly
34. L-Tyr-Gly
35. L-Phe-Gly
36. L-Val-Gly
37. L-Leu-L-Phe
38. L-Phe-L-Phe
39. DL-Ala-Gly-Gly
40. Poly-L-Lys · HCl
41. N-CBZ-Gly-L-Pro-L-Leu-Gly-L-Pro
42. Bovine albumin
43. Elastin powder
44. Bovine collagen
45. Bovine fibrinogen
46. Bovine fibrin
47. Bovine insulin
48. Bovine hemoglobin

AMIDES, PEPTIDES OR POLYPEPTIDES NOT HYDROLYZED BY TWO KERATINASES OF THE PRESENT INVENTION

1. L-Pro-β-Naph-NH₂
2. N-Tosyl-L-Arg-β-Naph-NH₂
3. L-Asn-β-Naph-NH₂
4. L-α-Asp-β-Naph-NH₂
5. L-β-Asp-β-Naph-NH₂
6. L-Hyp-β-Naph-NH₂
7. L-Try-β-Naph-NH₂
8. L-Tyr-β-Naph-NH₂
9. N-BZ-L-Tyr-Gly-NH₂
10. DL-Ala-DL-Ser
11. N-CBZ-L-Ala-L-Ser-OCH₃
12. N-CBZ-L-Ala-L-Val-OCH₃
13. N-CBZ-L-Met-Gly-OCH₃
14. Gly-L-Glu
15. N-CBZ-L-Val-L-Ala-OCH₃
16. N-CBZ-L-Tyr-Gly-NH₂
17. N-BZ-Gly-Gly
18. Gly-L-Ser
19. Gly-L-Pro
20. Gly-Gly
21. N-CBZ-L-Ala-Gly-Gly
22. L-Ser-Gly
23. β-Ala-DL-Leu
24. N-CBZ-L-Leu-L-Leu-NH₂
25. Poly-L-Gly
26. Poly-L-Leu
27. Poly-L-Phe
28. Poly-L-Glu In addition, Gly-L-Pro-Gly-Gly and L-γ-Glu-β-Naph-NH₂ are hydrolyzed by the first keratinase but not hydrolyzed by the second keratinase of the present invention.

We claim:

1. A process for making keratinolytic enzymes including:
   a. preparing an aqueous growth medium consisting of a 1-10 millimole solution of a magnesium salt having a pH of 7-9 and further including (per liter solution):
      1-5 grams horse hair
      .9 gram glucose
      .01 gram thiamine hydrochloride
      .01 gram pyridoxine hydrochloride
      .05 gram inositol
   b. inoculating said growth medium with *Trichophyton mentagrophytes* var. *granulosum*,
   c. allowing said *T.mentagrophytes* to incubate in said medium for several days,
   d. filtering said inoculated, incubated medium to separate the liquid fraction from the mycelium thereof,
   e. washing the mycelium to remove lipids therefrom,
   f. repeatedly contacting and mixing said washed mycelium with a NaCl phosphate buffered solution having a pH of 7.8 and dialyzing said solution mixture, forming a dialyzed extract, g. contacting said dialyzed extract with an enzyme adsorbent, and h. eluting adsorbed keratinolytic enzyme from said adsorbent and purifying said eluted enzyme by dissolution and gel filtration.

2. A process, as recited in claim 1, wherein said enzyme adsorbent is diethylaminoethyl cellulose, said adsorbed enzyme is eluted therefrom with a NaCl solution buffered to pH 7.5 with phosphate buffer, said solution containing said enzyme is dialyzed and lyophilized and said lyophilized enzyme is purified by dissolution in a phosphate buffered pH 7.5 solution and gel filtration.

3. A process, as recited in claim 1, wherein said enzyme adsorbent is carboxymethyl cellulose, said enzyme is eluted therefrom with a NaCl solution with a phosphate buffer having a pH of 7.8, dialyzed, lyophilized and purified by dissolution in a phosphate buffered pH 7.5 solution and gel filtration.

4. A process, as recited in claim 1, wherein said mycelium is washed with water and acetone.

5. A process, as recited in claim 1, wherein said washed mycelium is repeatedly contacted and mixed with a 0.5 m NaCl, 0.01 M phosphate buffer solution.

6. A process, as recited in claim 2, wherein adsorbed enzyme is eluted from said diethylaminoethyl cellulose with a 0.5 M NaCl, 0.01 M phosphate buffer solution and said gel filtration is effected on molecular sieves.

7. A process, as recited in claim 3, wherein adsorbed enzyme is eluted from said carboxymethyl cellulose with a 0.5 M NaCl, 0.01 M phosphate buffer, pH 7.8 and said gel filtration is effected on molecular sieves.

* * * * *

UNITED STATES PATENT OFFICE
CERTIFICATE OF CORRECTION

Patent No. 3,793,149                               Dated February 19, 1974

Inventor(s) Fritz Blank and Ruey J. Yu

It is certified that error appears in the above-identified patent and that said Letters Patent are hereby corrected as shown below:

<u>35 U.S.C. 254</u>

<u>Page 1</u>, The title "CELL-BOUND KERATINOLYTIC ENZYMES OR TRICHOPHYTON MENTAGROPHYTES AND PROCESS THEREFOR" should read --CELL-BOUND KERATINOLYTIC ENZYMES OF TRICHOPHYTON MENTAGROPHYTES AND PROCESS THEREFOR--.

Column 1, lines 1-3, "CELL-BOUND KERATINOLYTIC ENZYMES OR TRICHOPHYTON MENTAGROPHYTES AND PROCESS THEREFOR" should read --CELL-BOUND KERATINOLYTIC ENZYMES OF TRICHOPHYTON MENTAGROPHYTES AND PROCESS THEREFOR--.

Column 4, line 58 "Nacl" should read --NaCl--.

Column 8, Claim 5, "0.5 m" should read --0.5 M--.

Signed and sealed this 17th day of September 1974.

(SEAL)
Attest:

McCOY M. GIBSON JR.                     C. MARSHALL DANN
Attesting Officer                       Commissioner of Patents